United States Patent [19]

Riedel et al.

[11] Patent Number: 5,863,462
[45] Date of Patent: Jan. 26, 1999

[54] SICN GELS AS PRECURSORS OF NON-OXIDIC SILICON CERAMICS

[75] Inventors: Ralf Riedel, Babenhausen; Andreas Gabriel, Pfungstadt, both of Germany

[73] Assignee: Bayer AG, Leverkusen, Germany

[21] Appl. No.: 916,840

[22] Filed: Aug. 22, 1997

[30] Foreign Application Priority Data

Aug. 29, 1996 [DE] Germany ............... 196 34 799.8

[51] Int. Cl.⁶ ............... B01J 13/00; C04B 35/584
[52] U.S. Cl. ............... 252/315.1; 106/287.11; 252/315.2; 501/12; 501/96.5
[58] Field of Search ............... 252/315.1, 315.2; 106/287.11; 501/12, 96.5

[56] References Cited

U.S. PATENT DOCUMENTS

| | | | |
|---|---|---|---|
| 4,594,330 | 6/1986 | Suzuki et al. | 106/287.11 X |
| 4,704,299 | 11/1987 | Wielonski et al. | 501/12 X |
| 5,049,529 | 9/1991 | Duboudin et al. | 501/96.5 X |
| 5,306,555 | 4/1994 | Ramamurthi et al | 501/12 X |
| 5,559,062 | 9/1996 | Okabe et al. | 501/96.5 X |
| 5,580,653 | 12/1996 | Tanaka et al. | 106/287.11 X |

FOREIGN PATENT DOCUMENTS

| | | |
|---|---|---|
| 44 30 817 | 3/1996 | Germany . |
| 195 02 095 | 7/1996 | Germany . |

OTHER PUBLICATIONS

A. Kienzle, J. Bill, F. Aldinger, R. Riedel, *Nanosized Si–C–N–Powder By Pyrolysis Of Highly Crosslinked Silyl-carbodiimide*, in *NanoStructured Materials*, vol. 6, pp. 349–352 (1995).

*Primary Examiner*—Richard D. Lovering
*Attorney, Agent, or Firm*—Connolly & Hutz

[57] ABSTRACT

The present invention relates to novel SiCN gels, which are obtained by reacting silylcarbodiimides $R_3Si-NCN-SiR_3$ (R=alkyl, aryl) with silanes $RSiX_3$ (R=H, alkyl, aryl; X=F, Cl, Br, I), and the use thereof to produce non-oxidic silicon ceramics.

17 Claims, No Drawings

SICN GELS AS PRECURSORS OF NON-OXIDIC SILICON CERAMICS

BACKGROUND OF THE INVENTION

1. Field of the Invention

The present invention relates to novel SiCN gels, which are obtained by reacting silylcarbodiimides $R_3Si$—NCN—$SiR_3$ (R=alkyl, aryl) with silanes $RSiX_3$ (R=H, alkyl, aryl; X=F, Cl, Br, I), and the use thereof to produce non-oxidic silicon ceramics.

2. Description of the Prior Art

Polymeric ceramic precursors are known from DE-OS 44 30 817 which are obtained by reacting bis(trialkylsilyl)carbo-diimide with halides of the groups IIIA, IVA and VA of the Periodic Table. In particular, the above Patent describes the reaction of bis(trimethylsilyl)carbodiimide with silicon tetrachloride. However, no SiCN gel is formed thereby. Moreover, during pyrolysis of the reaction product, crystalline phases are observed to appear from temperatures as low as 400° C.; it is not possible to produce completely amorphous ceramic substances.

SUMMARY OF THE INVENTION

It has been found that, by reacting silylcarbodiimides and (alkyl)trihalosilanes, polymeric ceramic precursors may be produced in the form of stable gels, which exhibit low porosity and which may be converted by pyrolysis in an inert or reactive atmosphere into non-oxidic silicon ceramics which do not crystallize below approximately 1450° C.

The present invention thus provides SiCN gels obtainable by reacting silylcarbodiimides $R_3Si$—NCN—$SiR_3$ (R=alkyl, aryl) with silanes $RSiX_3$ (R=H, alkyl, aryl; X=F, Cl, Br, I). The invention further provides the use of the SiCN gels according to the invention to produce ceramic powders, coatings, moulded articles, fibres and membranes and to impregnate porous substrates.

DESCRIPTION OF THE PREFERRED EMBODIMENTS

Starting components of the SiCN gels according to the invention are silylcarbodiimides of the type $R_3Si$—NCN—$SiR_3$, wherein R symbolises an alkyl or aryl group, especially a methyl, ethyl or phenyl group, and (alkyl)trihalosilanes of the type $RSiX_3$, wherein R may be a hydrogen atom or an alkyl or aryl group, especially a methyl, ethyl, propyl, isopropyl or phenyl group and X stands for fluorine, chlorine, bromine or iodine. Formation of the SiCN gels according to the invention is catalysed by the addition of a base. Pyridine is added as the catalyst in amounts of 0.01 to 1.5 equivalents, based on the molar amount of (alkyl)trihalosilane.

The SiCN gels according to the invention are produced according to the following overall reaction:

$$nRSiX_3 + 1.5nR'_3Si\text{—NCN—}SiR'_3 \rightarrow [RSi(NCN)_{1.5}]_n + 3nR'_3SiX$$

In a particular embodiment of the invention, the SiCN gels according to the invention are produced by mixing starting components and catalyst and stirring the mixture until gel point is reached. The reaction time depends on the amount of base added, the reaction temperature and the stirring speed. It amounts, as a rule, to between 10 minutes and 15 hours. The temperature for the reaction is advantageously set at a value between room temperature and approximately 80° C.

In another embodiment the reaction is carried out at room temperature without stirring. The reaction time required is naturally longer and may amount to as much as several weeks.

Reaction of the educts generally occurs without added substances, but production of the SiCN gels according to the invention may also be carried out in inert solvents such as THF, diethyl ether or toluene.

After production thereof, the SiCN gels according to the invention may be subjected to a drying stage, in which highly volatile reaction products, the catalyst and the optional solvent are removed. This is preferably effected under a reduced pressure, at room temperature or at a higher temperature. A xerogel is obtained, which occurs in compact or powder form depending on the drying conditions. A peculiarity of this xerogel is its low porosity; the available surface area amounts to less than 1, preferably even less than 0.1 m$^2$/g (determined by BET measurements).

In another embodiment, the SiCN gels according to the invention are allowed to age prior to the drying stage at temperatures of up to 54° C., wherein a three-dimensional shrinkage process occurs. In the case of gel layers, completion of this process takes from several minutes to a few hours, while in the case of mouldings the process lasts from approximately 5 days to 8 weeks. Transparent, crack-free mouldings of xerogel may thus be obtained after drying.

Prior to ageing/drying, the SiCN gels according to the invention may subjected to the most varied shaping processes, such as casting, extrusion, fibre-drawing etc. In this way, after subsequent pyrolysis, it is possible to obtain ceramic coatings, monolithic mouldings and composites, fibres or membranes.

The SiCN gels according to the invention are also suitable for the impregnation of porous substrates, which may consist, for example, of ceramics or carbon. In a preferred embodiment, the substrates to be impregnated are introduced into a mixture of the starting components; the reaction is then started by addition of the catalyst. The SiCN gels according to the invention then form in situ and fill the pores of the substrate.

Conversion of the SiCN gels according to the invention into non-oxidic silicon ceramics is effected by pyrolysis in an inert atmosphere, e.g. argon, helium, nitrogen, or in a reactive atmosphere, e.g. ammonia. This enables adjustment of the carbon content of the end product. The pyrolysis temperature may be up to 1400° C., if an amorphous ceramic is to be produced. Above approximately 1450° C. the product crystallizes.

EXAMPLES

All reactions were carried out in annealed glassware under a dried argon stream. The IR (KBr compact) and RAMAN samples were prepared in a protective atmosphere and measured. The STA measurements (Netzsch 429 with mass spectrometer Balzers QMG 420) were carried out under helium with a heating rate of 2K min$^{-1}$.

Example 1

$[MeSi(NCN)_{1.5}]_n$ (gel bodies)

20.0 g (107 mmol) of bis(trimethylsilyl)-carbodiimide were weighed out into a 100 ml protective gas flask and added to 10.7 g (71.6 mmol) of methyltrichlorosilane. After the addition of 566 mg (10.7 mmol) of pyridine, the mixture was heated to 90° C. oil bath temperature. After 13 hours gel point was reached. For the purpose of ageing, the reactor charge was held at 45° C. After completion of the ageing process, the remaining liquid was poured off and the residual liquid phase was evaporated off at 50° C. under protective gas, whereby a transparent moulding was obtained.

The thermally induced ceramicisation of the xerogel was examined in He by means of simultaneous thermal analysis (STA) in the temperature range between room temperature and 1500° C. The ceramic yield amounted, therefore, to 60%. In the temperature range from 560°–590° C. a mass loss of 20% was measured, accompanied by an exothermic reaction. The in situ decomposition products determined by mass spectroscopy could be overwhelmingly identified as methane (mass no. =16) and acetonitrile or methylisonitrile (mass no. =41) and fragments thereof. Between 850° and 1120° C. a 10% mass loss again occurred, which is based exclusively on nitrogen elimination.

FT—IR (KBr compact): v [cm$^{-1}$]=2965 (SiMe), 2152 (NCN), 1270 (SiMe), 748 (SiN); RAMAN: v [cm$^{-1}$]=2974 (SiMe), 2906 (SiMe), 1533 (NCN); $^{29}$Si—CP/MAS NMR (300 MHz): d=−62.3 ppm; C$_{2.5}$H$_3$N$_3$Si (103.16): calculated C 29.11, N 40.73, O 0.00, Si 27.23; found C 28.75, N 38.3, O 0.28, Si 26.9; pyrolysate (700° C.) C 19.0, N 44.8, O 0.26; pyrolysate (1200° C.) C 21.1, N 34.4, O 0.32.

Example 2

In situ coatings/impregnations

Toluene is placed in a quartz vessel as a solvent. A porous substrate is immersed therein, or a ceramic powder to be coated is suspended therein. Starting components in stoichiometric relationship and catalyst are then added, and the mixture is heated to boiling point. When the reaction is complete, the liquid components are distilled off under reduced pressure and the polymer-coated substrate is pyrolysed at 1000° C.

What is claimed is:

1. A SiCN-based gel obtainable by reacting silylcarbodiimides having the formula:

R'$_3$Si—NCN—SiR'$_3$, where R'=alkyl or aryl, with silanes having the formula:

RSiX$_3$, where R=H, alkyl or aryl and X=F, Cl, Br or I.

2. A SiCN-based gel according to claim 1, wherein R' represents a methyl group, an ethyl group, or a phenyl group.

3. The SiCN-based gel according to claim 1, wherein R represents a methyl group, an ethyl group, a propyl group, an isopropyl group, or a phenyl group.

4. The SiCN-based gel according to claim 1, wherein the silylcarbodiimides and the silanes are reacted in the presence of a base catalyst.

5. The SiCN-based gel according to claim 1, which comprises a xerogel.

6. A SiCn-based gel comprising a reaction product of a silylcarbodiimide having the formula:

R'$_3$Si—NCN-13 SiR'$_3$, wherein R' represents an alkyl or an aryl group;
   and a trihalosilane having the formula:

RSiX$_3$, wherein R represents a hydrogen, an alkyl group, or an aryl group, and X represents a halogen atom.

7. The SiCN-based gel according to claim 6, wherein R' represents a methyl group, an ethyl group, or a phenyl group.

8. The SiCN-based gel according to claim 6, wherein R represents a methyl group, an ethyl group, a propyl group, an isopropyl group, or a phenyl group.

9. The SiCN-based gel according to claim 6, wherein the reaction product is formed in the presence of a base catalyst.

10. The SiCN-based gel according to claim 9, wherein the base catalyst comprises pyridine.

11. The SiCN-based gel according to claim 10, wherein pyridine is used in an amount of about 0.01 to about 1.5 equivalents, based on a molar amount of the trihalosilane.

12. The SiCN-based gel according to claim 6, which comprises a xerogel.

13. The SiCN-based gel according to claim 12, wherein the xerogel has an available surface area as determined by BET measurements of about less than 1 m$^2$/g.

14. The SiCN-based gel according to claim 6, wherein the reaction product has the formula:

[RSi(NCN)$_{1.5}$]$_n$, where R is defined as in claim 3 and n is greater than zero.

15. The SiCN-based gel according to claim 14, where R represents a methyl, ethyl, propyl, isopropyl or phenyl group.

16. A method of producing a SiCN-based gel, the method comprising reacting a silylcarbodiimide having the formula:

R'$_3$Si—NCN—SiR'$_3$, wherein R' represents an alkyl or aryl group;
   with a trihalosilane having the formula:

RSiX$_3$, wherein R represents hydrogen, an alkyl group, or an aryl group, and X represents a halogen atom; in the presence of a catalyst; optionally in the presence of a solvent; and optionally drying the SiCN-based gel to form a xerogel.

17. A SiCN-based gel prepared by reacting a silylcarbodiimide having the formula:

R'$_3$Si—NCN—SiR'$_3$, where R' is an alkyl or aryl group, with a trihalosilane having the formula RSiX$_3$, where R is H, an alkyl group or an aryl group and X is a halogen atom, in the presence of a catalyst, and optionally in the presence of an inert solvent.

* * * * *